Figure 1:
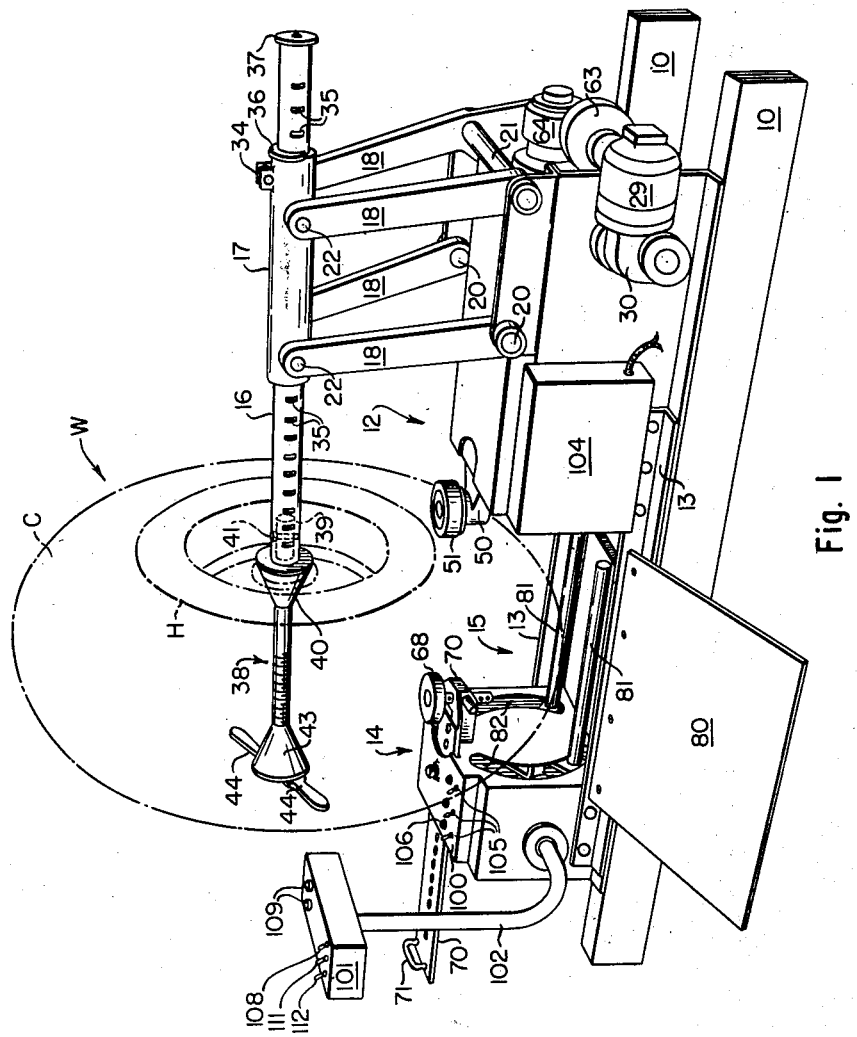

March 5, 1957  J. W. POZERYCKI ET AL  2,783,830
POWER ACTUATED TIRE CHANGING MACHINE
Filed Jan. 28, 1954  3 Sheets-Sheet 1

INVENTORS
JOHN W. POZERYCKI
WESLEY E. LAZOTT
THOMAS FLINT
GRAYDON SMITH
BY
ATTORNEYS

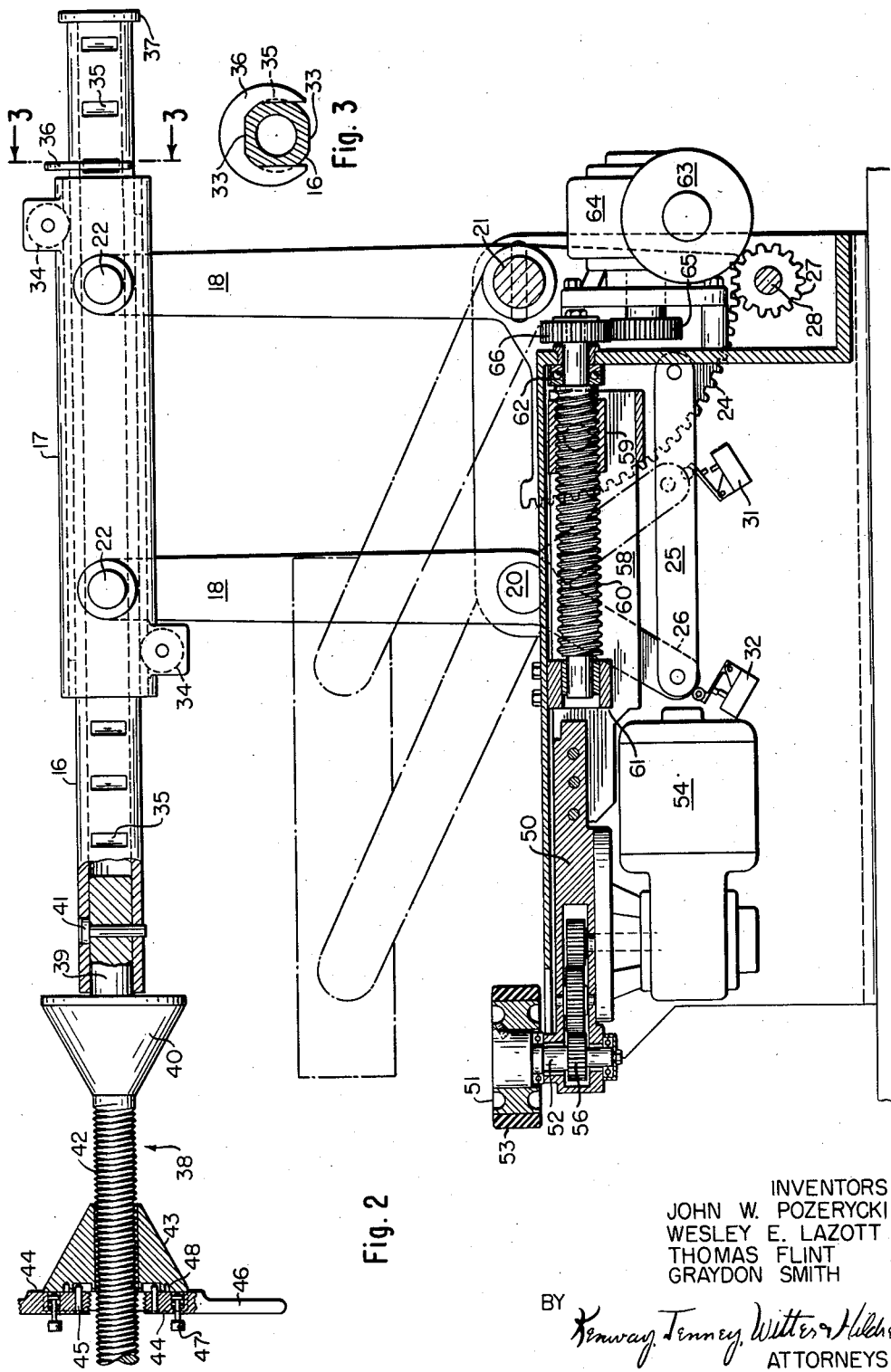

March 5, 1957   J. W. POZERYCKI ET AL   2,783,830
POWER ACTUATED TIRE CHANGING MACHINE
Filed Jan. 28, 1954   3 Sheets-Sheet 3
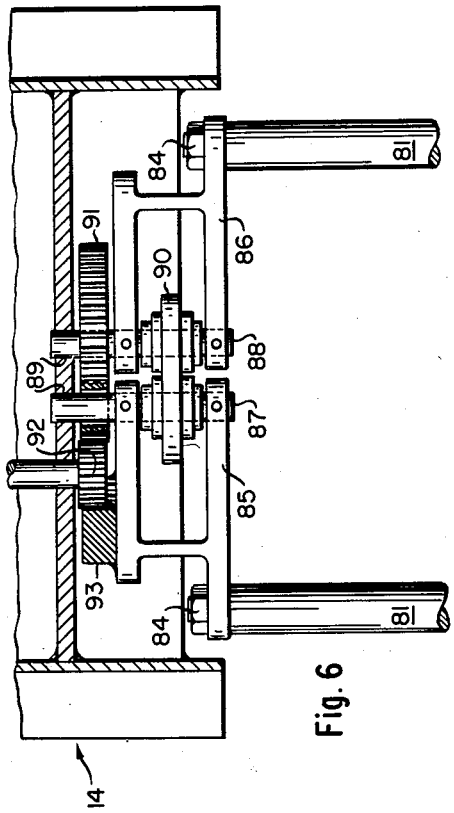
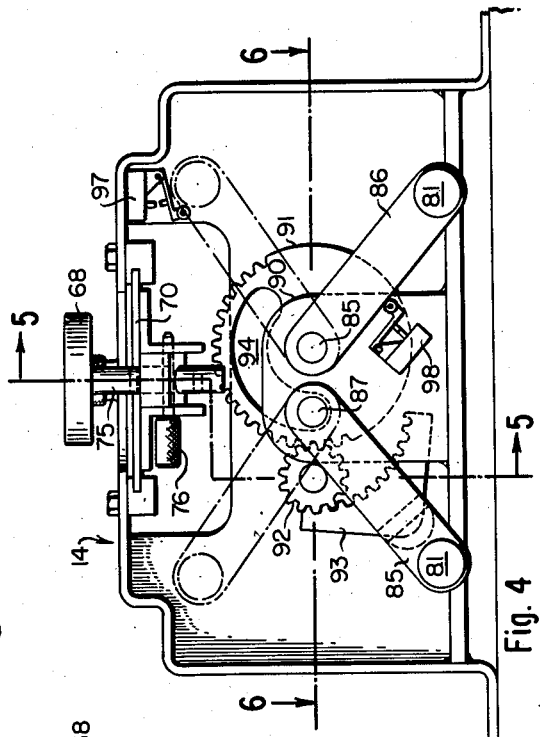
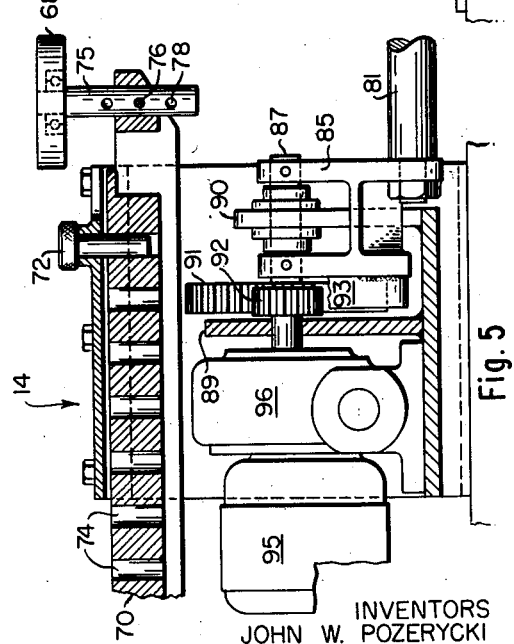
INVENTORS
JOHN W. POZERYCKI
WESLEY E. LAZOTT
THOMAS FLINT
GRAYDON SMITH
BY
ATTORNEYS United States Patent Office 2,783,830
Patented Mar. 5, 1957

2,783,830

POWER ACTUATED TIRE CHANGING MACHINE

John W. Pozerycki, Walpole, Wesley E. Lazott, Woodville, and Thomas Flint and Graydon Smith, Concord, Mass., assignors, by mesne assignments, to Needham Manufacturing Company Inc., Needham Heights, Mass., a corporation of Massachusetts Application January 28, 1954, Serial No. 406,814

9 Claims. (Cl. 157—1.24)

This invention relates to a power operated machine for mounting and demounting pneumatic tires or casings from their wheel assemblies and more particularly aircraft and like casings that are too large to be thus conditioned manually. These wheel assemblies vary considerably in type and construction and include (1) the full flange type, (2) the split flange type, (3) the split wheel type and (4) the drop center type. Each type of wheel assembly introduces a different problem and sequence of operations and one object of the invention resides in the production of a machine that can service the different types mainly by power and with a minimum of manual labor.

The servicing of a wheel assembly by power requires that the wheel shall be supported for easy power manipulation and for this purpose our invention contemplates a horizontal arbor for receiving and supporting the wheel for free rotation on a horizontal axis. The demounting of the casing from its wheel assembly requires the breaking away of the casing beads from the retaining rims of the assembly and mechanism for serving this function includes opposed rollers for engaging the wheel and casing beads for this purpose together with power means for driving one of the rollers to rotate the wheel and power means for bringing the rollers closer together to break the beads from the rims as the beads travel past the rollers.

A preferred form of our machine includes two spaced supports providing a well therebetween for receiving the wheel supported on the arbor. In mounting the wheel on the arbor, the wheel is rolled into the well and a further feature of the invention resides in elevator mechanism disposed in one of the supports and extending into the well for raising the wheel to a position to receive the arbor. Power operated mechanism associated with one support carries the arbor which extends toward the well and includes novel means for receiving and supporting the wheel axially and against longitudinal movement thereon. The arbor supporting and operating means which we employ comprises a novel pivoted frame carrying a tubular guide within which the arbor is supported for longitudinal adjustment, pivotal movement of the frame being adapted to move the guide axially and laterally and cooperate with the adjustable arbor to accommodate wheels varying in size and perform other functions, all as hereinafter more specifically described.

The support on which the arbor is mounted also preferably includes a power operated slide carrying one of the rollers together with power means for rotating the roller, whereby to break the beads from the rims while rotating the wheel, the other and opposing roller being carried by the other support and mounted for adjustment toward and from the power driven roller to accommodate wheels differing in width.

As will be apparent, the several power operated mechanisms are adapted respectively to perform specific functions and, in the preferred form of the invention, each of these mechanisms is driven by a separate power unit such as an electric motor. A further feature of the invention resides in the employment of mechanism under the control of a single operator for effecting these functions as required to perform the desired mounting and demounting operations.

These and other features of the inventions will be best understood and appreciated from the following description of a preferred embodiment thereof selected for purposes of illustration and shown in the accompanying drawing in which—

Fig. 1 is a perspective view of our tire changing machine,

Fig. 2 is an enlarged elevation of a portion of the machine, partially in section, Fig. 3 is a sectional view taken on line 3—3 of Fig. 2, Fig. 4 is an end elevation of another portion of the machine, Fig. 5 is a sectional view taken on line 5—5 of Fig. 4, and Fig. 6 is a plan section taken on line 6—6 of Fig. 4.

Our tire changing machine can be fixed to and supported directly on the floor or on any suitable base, either fixed or mobile, and in Fig. 1 it is illustrated as mounted on two supporting rails 10. Disposed on and extending upwardly from the base are two supports 12 and 14 in spaced relation and providing an open wheel receiving well 15 therebetween. The two supports are rigidly secured together as by angle bars 13. As illustrated in Fig. 1, the wheel W to be demounted is supported at the well on the forward end of an arbor 16 mounted for axial adjustment in a tubular guide 17, the wheel being freely rotatable on the arbor through tapered roller bearings either as a part of the wheel assembly or as a part of the wheel supporting assembly on the arbor. The guide is supported in horizontal position on the free ends of two parallel pairs of arms 18, the two pairs of arms being pivoted to the support 12 on two parallel axes 20 and 21, and to the guide on two parallel axes 22 with the four axes located at the four corners of a parallelogram. The arrangement is such that pivotal movement of the arms about the axes 20 and 21 moves the guide axially and vertically and maintains the guide in horizontal position. The rear pair of arms are fixed to a shaft 21 also carrying a gear segment 24 connected by a link 25 to an arm 26 fixed to the adjacent forward arm 18. The other two forward and rearward arms can be connected in like manner. As thus connected the arms move together and maintain the guide 17 in horizontal position.

A driving pinion 27 fixed to a shaft 28 is in mesh with the gear segment 24. The shaft 28 is driven from a reversible motor 29 through suitable reduction gearing indicated generally at 30 and of conventional construction. Limit switches 31 and 32 positioned to be engaged by the arm 26 are adapted to limit the forward and rearward movements of the guide 17 to the positions illustrated in Fig. 2.

The arbor 16 is flattened above and below at 33 to cooperate with supporting rollers 34 carried by the guide 17. The arbor is also provided along its length with a plurality of pairs of open slots 35 for receiving a U-shaped locking piece 36 either rearwardly or forwardly of the guide, and forward movement of the arbor in the guide is limited by an annular shoulder 37 on the rear end of the arbor. The arbor is of tubular construction to receive in its forward end the shank 39 of an adaptor 38 for supporting the wheel assembly W, the arbor and shank having aligned holes for receiving a locking pin 41.

The adaptor 38 includes a wheel engaging cone 40 integral with the shank 39 and with the threaded portion 42 of the shank forwardly of the cone. The wheels W to be serviced are adapted to be supported on the adaptor between the cone 40 and a cooperating cone 43. The cone 43 is bored to slide on and along the threaded shank and is provided with a pair of retractable elements 44 threaded at their inner ends to engage the threads 42. The elements 44 are in opposed relation and are mounted to slide in guides radially of the cone, the guides including pins 45 carried by the elements and engaging in radial slots in the cone. Each element carries a handle 46 and a spring-pressed detent 47, the detent being adapted to engage in holes 48 for securing the elements in engagement with the threads 42. The construction permits the shank 42 to be extended through the hub of a wheel with the cone 40 in engagement with the hub. The cone 43 is placed on the shank 42 and brought into engagement with the opposite side of the hub. The elements 44 are then engaged with the threads 42 and the cone 43 is rotated forwardly to clamp the wheel tightly between the cones.

Mounted to slide in suitable guideways on the support 12 toward and from the well 15 is a slide 50 carrying a tire engaging and driving roller 51 on its forward end. The roller is mounted on the top end of a vertical shaft 52 and includes a frictional band 53 for engaging and rotating the wheel. The roller is driven in either direction by a reversible motor 54 carried on the support and operatively connected to the roller through suitable mechanism including a chain of spur gears 56.

The slide 50 includes a rear portion 58 carrying a nut 59 on a screw 60. The screw is supported at its ends and against axial movement in bearings 61 and 62 secured to the support 12, rotation of the screw in opposite directions being adapted to move the slide forwardly and rearwardly. The screw is driven by a reversible motor 63 carried on the support and operatively connected to the screw through reduction gearing at 64 and spur gears 65 and 66.

Cooperating with the roller 51 is a second roller 68 mounted on the forward end of a slide 70. The slide 70 is supported in the top portion of the support 14 for adjustment by means of a handle 71 toward and from the roller 51. The slide can be held in different positions of adjustment by a pin 72 carried on the support and engageable in any one of a series of holes 74 in the slide. The roller 68 is rotatably mounted on the top end of a post 75 and can be held in different positions of elevation by a pin 76 carried on the support and engageable in any one of a series of holes 78 in the post.

A plate 80 is adapted to serve as a ramp upon which the wheel W to be serviced can be rolled to the well 15. Also disposed within the well are two spaced and parallel wheel supporting rods 81 serving as a elevator to raise and lower the wheel. The rods are supported at one end on elevating mechanism within the support 14 and extend outwardly to the well through two slots 82. Inwardly of the support the two rods are respectively fixed by nuts 84 to the outer ends of two yokes 85 and 86. The two yokes are respectively fixed to two parallel shafts 87 and 88 rotatably mounted in bearings 89 and 90 in the support. A gear 91 fixed to the shaft 88 is in mesh with a driving pinion 92 also in mesh with a gear segment 93 carried on the yoke 85, the shaft 87 extending through an arcuate slot 94 in the gear 91. The arrangement is such that rotation of the pinion 92 in one direction raises the yokes and rods, as illustrated in Fig. 4, and rotation in the opposite direction lowers the same. The pinion is driven by a reversible motor 95 through suitable reduction gearing indicated at 96. Limit switches 97 and 98 positioned to be engaged by the yoke 86 are adapted to limit the upward and downward movements of the yokes to the positions illustrated in Fig. 4.

The machine is power operated by the four reversible motors 29, 54, 63 and 95 and all are under the control of a single operator. The controlling mechanism illustrated in the drawing comprises a selector panel 100 on the support 14, a control panel 101 supported on a post 102 adjacent to the selector panel, and a relay box 104. The selector panel 100 embodies three switches 105 for selecting which of the three motors 29, 63 or 95 is to be operated and red panel lamps 106 are provided for indicating the "on" position. Only one of these motors is selected and operated at one time.

The control panel 101 includes a switch 108 marked "main power" and when this switch is "on" the motor selected can be operated in forward and reverse directions by two push buttons 109. An independent circuit is provided for the motor 54 and this circuit is under the control of two switches 111 and 112 and the motor can be operated in conjunction with any of the other three motors. The switch 111 controls the operation of the motor 54 and switch 112 controls its direction of rotation. Thus the operator has all the power operated functions under his control and can select and implement such functions as are required to perform the particular operations at hand. It will be understood that the different types of wheel assemblies will require differing operations and the power operated mechanism comprising our invention is adapted to serve all these required functions. These operations include both assembling and disassembling of the casing C to and from the hub assembly. The handling of the control requires a considerable amount of technique that can be acquired only in the actual procedure and practice of mounting and demounting wheel assemblies of the various types enumerated.

The loading of a wheel W to be disassembled will vary somewhat with the different types of wheels but the usual procedure requires the rolling of the wheel onto the rods 81 in the well and the elevating of the wheel to a position to receive the adaptor 38. With the arbor 16 fully retracted and the cone 43 removed from the adaptor, the tubular guide 17 is raised or lowered to a position aligning the adaptor with the axial opening of the wheel hub. The shank 42 is then passed through the opening and the cone 40 engaged with the hub. The cone 43 is then placed on the shank and brought into engagement with the opposite face of the hub. The elements 44 are engaged with the threads 42 and the cone 43 is rotated forwardly to clamp the wheel tightly between the cones. The rods 81 are now lowered to leave the wheel supported for rotation on its bearings on the arbor.

If, for example, the wheel assembly W to be disassembled is of the removable flange type, the removable flange is disposed on the side facing the support 14. The arbor is elevated to a position bringing the annular flange H of the hub assembly opposite to the roller 51 and the roller 68 is placed in position to engage the tire bead adjacent to the adjacent flange. The slide 50 is then advanced to engage the rotating roller 51 with the flange H and rotate the wheel assembly. Continued advancing of the slide and rotating of the assembly causes the roller 68 to force the tire bead inwardly and expose the locking ring. The rotation is then stopped and the locking ring and removable flange are removed. Both rollers 51 and 68 are thereupon retracted and the rods 81 and arbor are elevated to place the annular flange H of the hub assembly just above the roller 51. The slide 50 is then advanced to place the rotating roller 51 in contact with the tire bead adjacent to the flange. Continued rotation of the wheel and advancing of the slide thereupon breaks the bead from the flange H of the hub assembly. The arbor is then pulled rearwardly to withdraw the hub assembly from the casing. By removing the pin 41 the adaptor 38 can be removed from the arbor with the hub and thereafter removed from the hub and replaced on the arbor for further use.

Various other motions and sequence of operations for demounting and mounting the wheel assemblies are required for the different types of assemblies, including the tire and hub supporting force exerted by the axial and lateral movements of the arbor and a lateral force adapted to be exerted on the tire by and between the elevating mechanism and the arbor transversely of and relative to the arbor. Thus the rods 81 also serve as a support for the tire during the forward and rearward movements of the arbor in the mounting and demounting operations. When the arbor is employed to produce a pushing effect on the wheel assembly the locking piece 36 is placed forwardly of the tubular guide 17 and to produce a pulling effect the locking piece is placed rearwardly of the guide. It will be noted that the guide and arbor remain horizontal in all positions of the supporting arms 18. Thus the primary and heavy operations required in the mounting and demounting of the wheel assemblies are performed by power and only minor and lighter manual operations are required.

Since the machine is designed to be universal, for all designs and sizes of casings, it is necessary that forces be applied during the operation which are horizontal, vertical or a component thereof, and the arc-like motion derived by the simultaneous axial and lateral movements of the arbor generates an action which is particularly useful for the removal of casings from drop center wheel assemblies. For example, when operating on wheel assemblies having no removable flanges, the beads of the casings are first broken away from the flanges and the casing is then gripped tightly between the rollers 51 and 68. The vertical-axial component movements of the arbor, both forwardly and rearwardly, while maintaining the horizontal position of the arbor, makes it possible relatively to force the two parts of the wheel assembly to a position such that one casing bead can easily be forced over its adjacent flange and the hub thereby removed from the casing. Conversely, this component action is applied in the axial and vertical directions in the assembling operation to enter and force the first flange into operative engagement with the bead of the tire. It will be apparent that a straight line axial movement of the arbor could not accomplish these functions and the use of these combined motions makes possible a power operated machine for performing assembling and disassembling operations on large wheel assemblies that have been previously accomplished by the use of hand tools on relatively small wheel assemblies.

It will be apparent that the rollers 51 and 68 together with their supporting slides provide abutment means on the base for gripping and holding the tire therebetween in a vice-like action while the arbor movements function to assemble the hub thereinto or disassemble it therefrom. The rollers furthermore serve the function of breaking the tire beads from the hub flanges and the power driven roller 51 also serves to rotate the tire. The rods 81 together with their operating mechanism serve both to support the tire and move it vertically.

Having thus disclosed our invention what we claim as new and desire to secure by Letters Patent is:

1. A tire changing machine comprising a base, an arbor on the base, means for rotatably supporting axially on the arbor the hub of a wheel assembly including a tire on the hub, power operated means including a roller for engaging one face of and rotating the assembly, and power operated means including an opposed roller at the other face for engaging the tire adjacent to the hub and progressively forcing its bead inwardly as the tire is rotated.

2. A tire changing machine, comprising a base, two supports disposed on and extending upwardly from the base in spaced relation longitudinally of the base and providing an open wheel-receiving well therebetween, an arbor carried on one support with one free end directed toward and adjacent to the well, power means for moving the arbor axially toward and from the well, means for rotatably supporting a wheel axially on the free end of the arbor at the well, a roller carried by one of the supports in position to engage and rotate the wheel on the arbor, power means for rotating the roller, an opposing roller carried by the support, and power means for moving one of the rollers toward the other roller.

3. The machine defined in claim 2 plus means for adjusting said other roller toward and from said one roller.

4. The machine defined in claim 2 in which the first named power means includes power means for moving the arbor vertically.

5. The machine defined in claim 2 plus two spaced and parallel wheel supporting rods extending horizontally into the well from one of said supports, means supporting the rods at one end within the support, and power means for elevating and lowering the two rods simultaneously while maintaining their parallel relation.

6. A tire changing machine comprising a base, two supports disposed on and extending upwardly from the base in spaced relation longitudinally of the base and providing an open wheel-receiving well therebetween, an arbor carried on one support with one free end directed toward and adjacent to the well, power means for moving the arbor axially toward and from the well, means for rotatably supporting a wheel axially on the free end of the arbor at the well, a slide movable in said one support longitudinally of the base, a wheel engaging and rotating roller on the slide at the well, power means for moving the slide, power means for rotating the roller, and an opposing roller carried by the other support.

7. A tire changing machine comprising a base, an arbor on the base, power means for moving the arbor axially, means for rotatably supporting a wheel axially and against axial movement on the arbor, abutment means on the base including two opposed rollers for engaging opposite faces of a wheel and tire assembly on the arbor, power means for rotating one of the rollers to rotate the wheel on the arbor, power means for moving the last named roller toward the other roller to engage the tire therebetween, and means under the control of a single operator for controlling all of said power means.

8. A tire changing machine comprising a base, an arbor, means supporting the arbor horizontally on the base with a free end projecting forwardly, means for rotatably supporting a wheel hub assembly axially and against relative axial movement on said end of the arbor, power operated means for moving the arbor axially, abutment means on the base for engaging a tire on the wheel and preventing its movement with and axially of the arbor and including a power driven roller for engaging the tire and rotating the wheel on the arbor, and power operated means for moving the roller toward and into pressure contact with the tire.

9. The machine defined in claim 8 in which said roller is disposed to be engaged in lateral pressure contact with a side wall of the tire and the abutment means includes an opposing roller disposed to engage the opposite side wall of the tire adjacent to the hub assembly to grip the tire therebetween.

References Cited in the file of this patent
UNITED STATES PATENTS

| Number | Name | Date |
|---|---|---|
| 798,974 | Poole | Sept. 5, 1905 |
| 1,509,870 | Klein | Sept. 30, 1924 |
| 1,824,246 | Van Daam | Sept. 22, 1931 |
| 2,146,417 | Catalano | Feb. 7, 1939 |
| 2,201,982 | Bazarek | May 28, 1940 |
| 2,423,652 | Kelley | July 8, 1947 |
| 2,436,941 | Sendoykas | Mar. 2, 1948 |
| 2,470,534 | Thomas | May 17, 1949 |
| 2,546,988 | Eberly | Apr. 3, 1951 |
| 2,581,569 | Zugaro et al. | Jan. 8, 1952 |
| 2,598,946 | Teegarden | June 3, 1952 |